(12) United States Patent
Cheve et al.

(10) Patent No.: US 9,746,347 B2
(45) Date of Patent: Aug. 29, 2017

(54) SENSOR UNIT AND INSTRUMENTED BEARING COMPRISING SUCH A SENSOR UNIT

(71) Applicants: Olivier Cheve, Chanceaux sur Choisille (FR); Florian Barcat, Tours (FR); Nicolas Dhomette, Savonnieres (FR); Jérôme Carnac, Vallieres-les-gralldes (FR)

(72) Inventors: Olivier Cheve, Chanceaux sur Choisille (FR); Florian Barcat, Tours (FR); Nicolas Dhomette, Savonnieres (FR); Jérôme Carnac, Vallieres-les-gralldes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 96 days.

(21) Appl. No.: 14/760,861

(22) PCT Filed: Jan. 15, 2013

(86) PCT No.: PCT/EP2013/050669
§ 371 (c)(1),
(2) Date: Jul. 14, 2015

(87) PCT Pub. No.: WO2014/111131
PCT Pub. Date: Jul. 24, 2014

(65) Prior Publication Data
US 2015/0354990 A1    Dec. 10, 2015

(51) Int. Cl.
*G01B 7/30* (2006.01)
*G01D 5/20* (2006.01)
(Continued)

(52) U.S. Cl.
CPC .......... *G01D 5/2006* (2013.01); *G01D 5/245* (2013.01); *G01D 11/245* (2013.01); *G01P 3/443* (2013.01); *G01P 3/487* (2013.01)

(58) Field of Classification Search
CPC ........................................ F16C 35/042–35/047
(Continued)

(56) References Cited

U.S. PATENT DOCUMENTS 4,675,607 A * 6/1987 Golker ..................... H05K 5/00
324/247
5,787,219 A  7/1998 Mueller et al.
(Continued)

FOREIGN PATENT DOCUMENTS

CN    1168015 A    12/1997
FR    2723162 A1    2/1996
(Continued)

*Primary Examiner* — Patrick Assouad
*Assistant Examiner* — Demetrius Pretlow
(74) *Attorney, Agent, or Firm* — Bryan Peckjian; SKF USA Inc. Patent Dept.

(57) ABSTRACT

A sensor for sensing an angular position of a rotatable element with respect to a non-rotatable element, the sensor comprising an encoder fast in rotation with the rotatable element, and a sensor body fixed respective to the non-rotatable element. The sensor body includes at least one sensing element adapted to sense angular position or rotation speed and direction of the encoder, a signal processor support member, and a sensing data output connector comprising at least one electrical wire connected to the support member. The sensor comprises a tubular body (accommodating the connector), including a first half-shell integral with the sensor body and a second half-shell assembled with the first half-shell around the connector. A tubular body internal surface comprises at least one radial ridge adapted to block a translation of the output connector along a longitudinal axis of the tubular body by penetrating into a sheath of the connector.

12 Claims, 6 Drawing Sheets

(51) Int. Cl.
*G01D 11/24* (2006.01)
*G01D 5/245* (2006.01)
*G01P 3/44* (2006.01)
*G01P 3/487* (2006.01)

(58) Field of Classification Search
USPC .................................................. 324/207.25
See application file for complete search history.

(56) References Cited

U.S. PATENT DOCUMENTS

| | | | | | |
|---|---|---|---|---|---|
| 6,086,396 | A | * | 7/2000 | Linaker | .................. H02B 1/205 |
| | | | | | 439/212 |
| 6,177,634 | B1 | * | 1/2001 | Smith | .................. H02G 15/013 |
| | | | | | 174/92 |
| 7,121,734 | B2 | * | 10/2006 | Taira | .................. G02B 6/3835 |
| | | | | | 385/78 |
| 7,465,196 | B2 | * | 12/2008 | Duarte | ................. H01R 13/567 |
| | | | | | 439/394 |
| 2004/0008951 | A1 | * | 1/2004 | Endo | .................... G02B 6/3855 |
| | | | | | 385/78 |
| 2008/0073120 | A1 | | 3/2008 | Drotleff | |

FOREIGN PATENT DOCUMENTS

| | | | |
|---|---|---|---|
| WO | 2010043021 | A1 | 12/2010 |
| WO | 2010139677 | A1 | 12/2010 |

* cited by examiner

SENSOR UNIT AND INSTRUMENTED BEARING COMPRISING SUCH A SENSOR UNIT

CROSS REFERENCE TO RELATED APPLICATIONS

This is a United States National Stage Application claiming the benefit of International Application Number PCT/EP2013/050669 filed on 15 Jan. 2013, which is incorporated herein by reference in its entirety.

TECHNICAL FIELD OF THE INVENTION

The present invention concerns a sensor unit for sensing the angular position of a rotatable element with respect to a non-rotatable element. The invention also concerns an instrumented bearing comprising a rolling bearing and such a sensor unit.

BACKGROUND OF THE INVENTION

Instrumented bearings are equipped with sensor units which generally comprise an output connector plugged on a printed circuit board of the sensor unit and adapted to transmit sensing data to a reception device. The output connector generally includes several electrical wires, which are soldered on the printed circuit board. The wires are protected by a sheath, and a jacket covers and protects the solderings.

Such output connectors can be pulled due to shocks, vibrations or handling mistakes, resulting in damages on the solderings or in the jacket being pulled off, leaving the wires and the solderings uncovered. When the jacket moves away, the tightness of the connector is lost and water or exterior particles can get in contact with the electrical wires.

SUMMARY OF THE INVENTION

The aim of the invention is to provide a new sensor unit, whose structure better protects the output connector and the solderings of the electrical wires of the output connector.

To this end, the invention concerns a sensor unit for sensing the angular position of a rotatable element with respect to a non-rotatable element, the sensor unit comprising an encoder, fast in rotation with the rotatable element, and a sensor body fixed with respect to the non-rotatable element, said sensor body including at least one sensing element adapted to sense the angular position or the rotation speed and direction of the encoder, a support member for signal processing means and an output connector for transmitting sensing data, the output connector comprising at least one electrical wire connected to the support member. This sensor unit is characterized in that it comprises a tubular body adapted to accommodate the output connector, said tubular body being divided into a first half shell integral with the holder and a second half shell assembled with the first half shell around the output connector, and in that an internal surface of the tubular body comprises at least one radial ridge adapted to block a translation of the output connector along a longitudinal axis of the tubular body by penetrating into a sheath of the output connector.

Thanks to the invention, the output connector is firmly retained in position by the ridges of the tubular body. This prevents the output connector from being pulled away and the solderings from being damaged. Moreover, the use of a supplementary jacket covering the ends of the electrical wires and the solderings is avoided.

According to further aspects of the invention, which are advantageous but not compulsory, such a sensor unit may include one or several of the following features:

- One of the half shells comprises protruding portions adapted to cooperate with recesses of the other half shell, and said protruding portions comprise planar surfaces adapted to cooperate with planar surfaces of said recesses, said planar surfaces being perpendicular to the longitudinal axis of the tubular body.
- The diameter of the at least one ridge is slightly inferior to the outer diameter of the output connector.
- The internal surface of the tubular body comprises two ridges.
- An internal cavity extending between the internal surface of the tubular body and the sheath of the output connector is filled with an encapsulating synthetic material.
- The at least one ridge is interrupted on a portion of its circumference.
- The two half shells of the tubular body are kept assembled to each other by a ferrule.
- The ferrule is metallic and is press fitted on the tubular body.
- The ferrule is synthetic and is welded on the tubular body.
- The ferrule is made from a synthetic material.
- One of the half shells of the tubular body comprises elastically deformable tabs, and a free end of each of said tabs comprises a hook adapted to be received in a recess of the other half shell in order to keep the two half shells assembled to each other.
- The two half shells of the tubular body are welded to each other.
- The first half shell of the tubular body is integral with a sensor holder which belongs to said sensor body and in which said at least one sensing element and said support member are mounted.

The invention also concerns an instrumented bearing comprising a rolling bearing and a sensor unit as mentioned here-above.

BRIEF DESCRIPTION OF THE FIGURES

The invention will now be explained in correspondence with the annexed figures, as an illustrative example. In the annexed figures.

DETAILED DESCRIPTION OF THE INVENTION

An instrumented bearing A is represented on FIGS. 1 to 8. Instrumented bearing A comprises a bearing B which includes an outer ring 2 forming a non-rotatable element, an inner ring 4 forming a rotatable element, and rolling elements, such as balls 6, arranged between outer ring 2 and inner ring 4. Rolling bearing B has a rotation axis X-X'.

Instrumented bearing A also includes a sensor unit 8, which comprises an encoder 82, which is fast in rotation with inner ring 4. Encoder 82 includes a metallic frame 82a and a magnetic ring 82b.

Sensor unit 8 also includes a sensor body 84, which has an annular shape centered around axis X-X' and which comprises several sensing elements 86 which are fixed with respect to outer ring 2 and adapted to sense the angular position or the rotation speed and direction of encoder 82 by detecting magnetic field variations generated by the rotation of encoder 82 around axis X-X'. Sensor body 84 is fast in rotation with outer ring 2 via a flange 7.

Sensor body 84 also includes a printed circuit board 88 to which sensing elements 86 are connected by pins 88b. Printed circuit board 88 forms a support member for non-represented processing means for sensing data generated by sensing elements 86. Printed circuit board 88 is housed in a holder 85 of sensor body 84. Holder 85 is preferably made of a synthetic material, but could also be made of a metallic material.

Sensor unit 8 also includes a cover 90, which can be made of a metallic material and which protects sensing elements 86 and printed circuit board 88 from exterior elements.

Between cover 90 and printed circuit board 88, sensor unit 8 comprises a synthetic material layer 92, which is preferably injected in sensor unit 8, between items 85, 88 and 90.

Sensor unit 8 comprises an output connector 94, which comprises several electrical wires 94a assembled together in an insulating sheath 94b. Ends 94a1 of wires 94a are soldered in holes 88a of printed circuit board 88. Alternatively, ends 94a1 can be connected to printed circuit board 88 by any other wire-to-board connection type.

Figure 1:
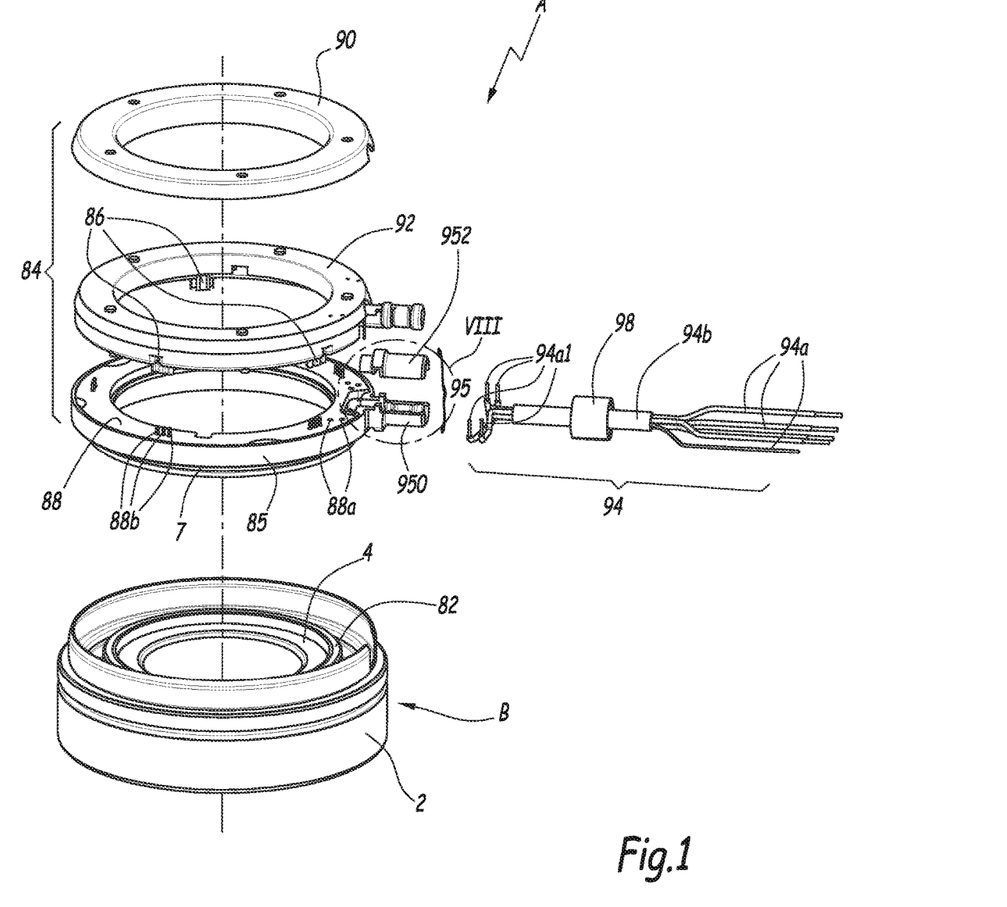
FIG. 1 is an exploded perspective view of an instrumented bearing comprising a sensor unit according to the invention.
Figures 2, 3:
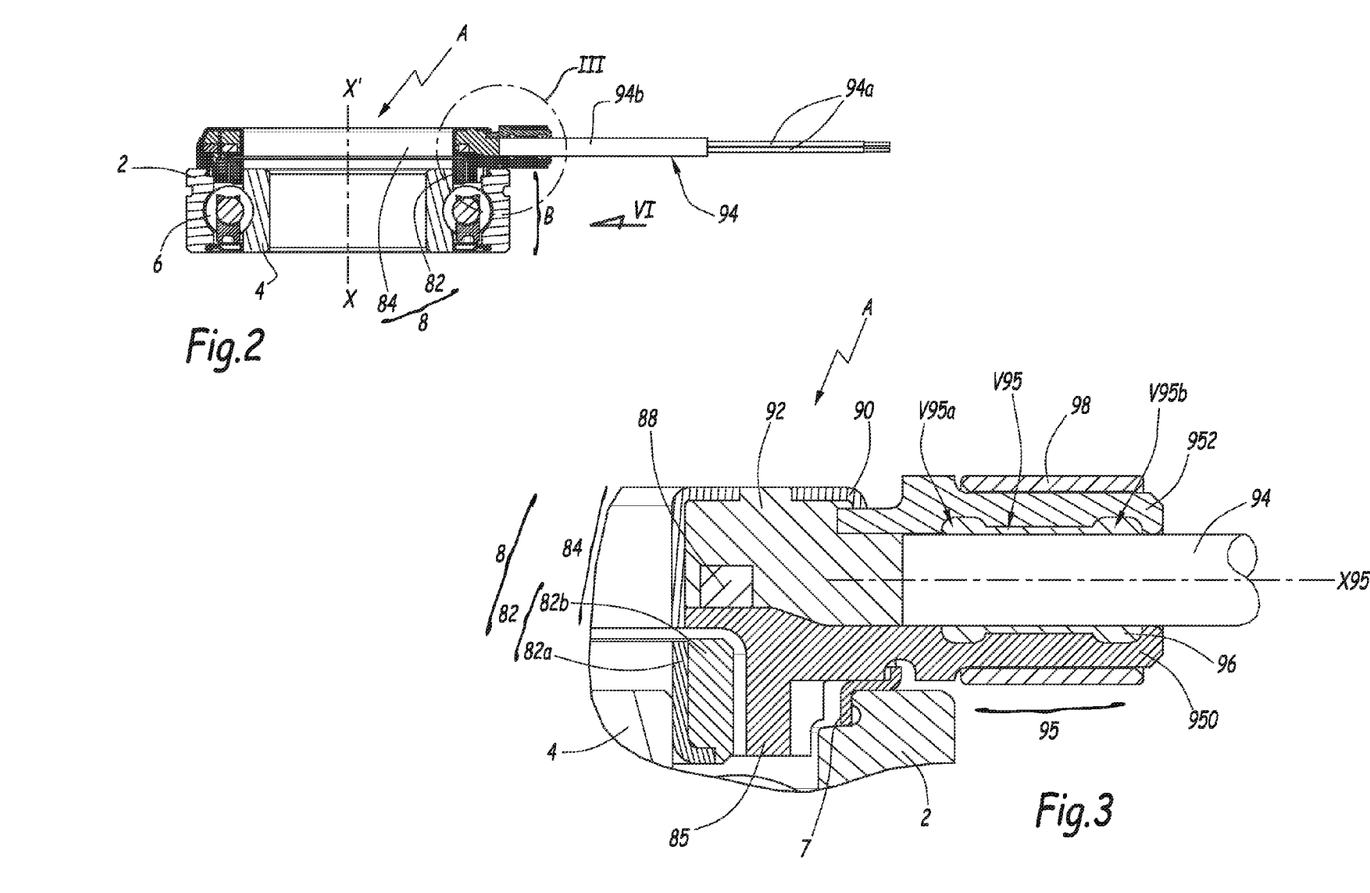
FIG. 2 is a sectional axial view of the instrumented bearing of FIG. 1.
FIG. 3 is a view at a larger scale of detail III on FIG. 2.
Figure 4:
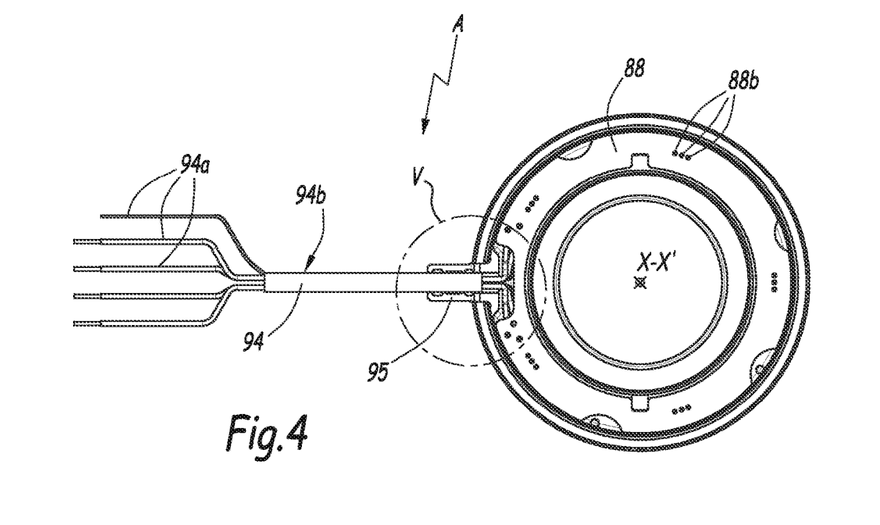
FIG. 4 is a top view, along arrow IV, on FIG. 2 of the instrumented bearing of FIGS. 1 to 3, a second half shell and a ferrule of the instrumented bearing being omitted in order to show the inside volume of a first half shell.

For the sake of clarity, wires 94a are not represented on FIGS. 2 and 3.

In a non-represented embodiment, there is only one electrical wire 94a.

Sensor body 84 comprises an outwardly extending tubular body 95 adapted to accommodate an end portion 94c output connector 94. Tubular body 95 is divided into a first half shell 950 and a second half shell 952, which are separated along a plane perpendicular to axis X-X'. First shell 950 is integral with sensor holder 85, while second half shell 952 is an independent part, which is assembled with first shell 950 around output connector 94.

Figure 8:
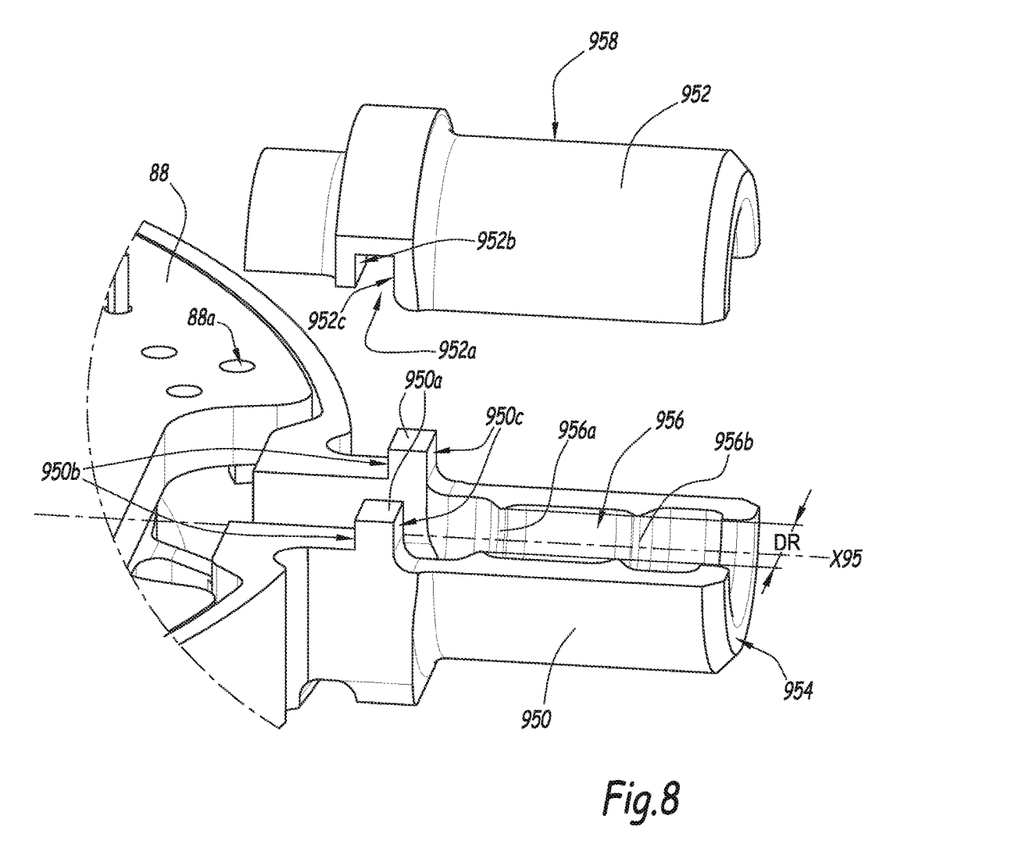
FIG. 8 is a view, at a larger scale, of detail VIII on FIG. 1.

As visible on FIG. 8, first half shell 950 comprises protruding portions 950a, each showing lateral planar surfaces 950b and 950c perpendicular to a longitudinal axis X95 of tubular body 95. Lateral surfaces 950b are oriented towards axis X-X', whereas lateral surfaces 950c are oriented towards an outer end 954 of tubular body 95. Axis X95 is radial with respect to axis X-X'.

Protruding portions 950a are received in recesses 952a of second half shell 952, which have a shape corresponding to the shape of protruding portions 950a. Recesses 952a have lateral planar surfaces 952b and 952c, which are respectively adapted to cooperate with lateral planar surfaces 950b and 950c. The planar contact between the lateral surfaces of protruding portions 950a and the lateral surfaces of recesses 952a provides a resistive force against the pulling out of connector 94 along axis X95, by allowing a stress take-up from second half shell 952 to first half shell 950. Protruding portions 950a and recesses 952 also permits a precise assembling of first shell 950 and second shell 952.

According to an alternative embodiment of the invention, protruding portions can be provided on half shell 952, whereas corresponding recesses are provided on half shell 950.

Figure 5:
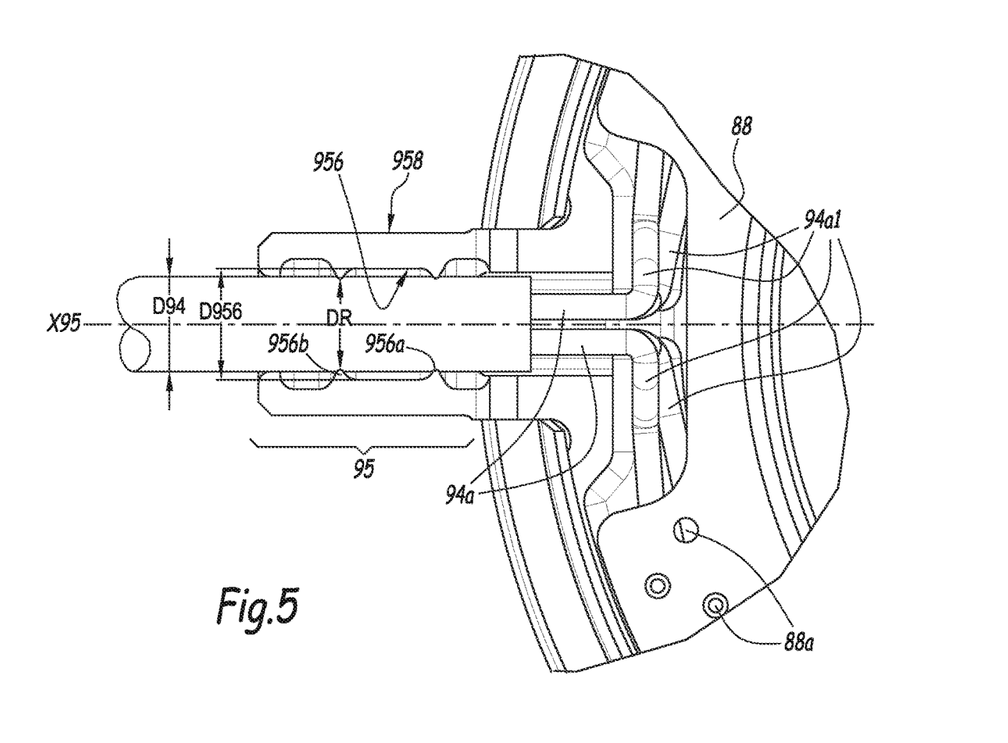
FIG. 5 is a view, at a larger scale, of detail V on FIG. 4.
Figure 6:
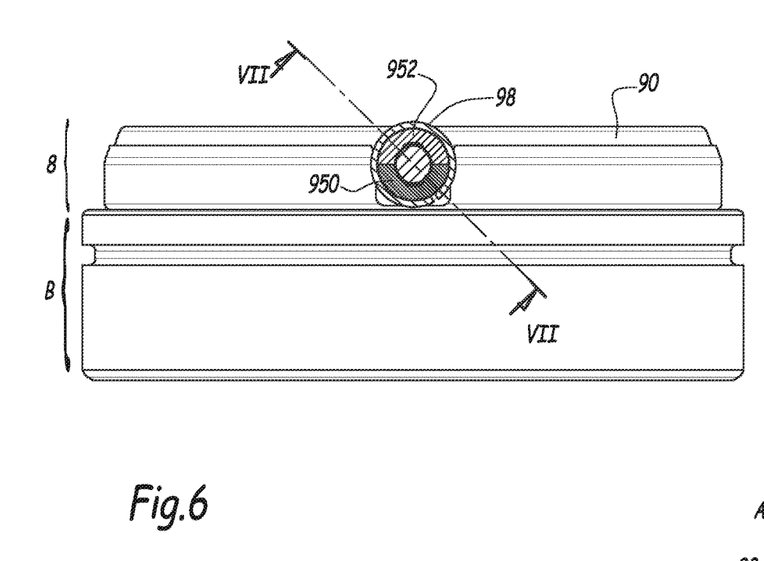
FIG. 6 is a side view along arrow VI on FIG. 2 of the instrumented bearing of FIGS. 1 to 5.
Figure 7:
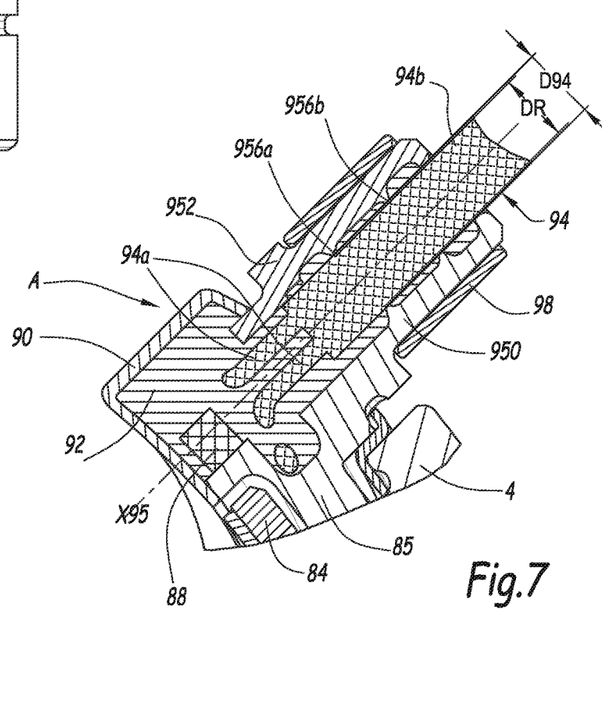
FIG. 7 is a partial sectional view along plane VII of the instrumented bearing of FIG. 6.

Tubular body 95 comprises an internal surface 956, which has a diameter D956 slightly superior to the outer diameter D94 of output connector 94. Internal surface 956 comprises radial ridges 956a and 956b, which protrudes inwardly towards axis X95 from a base radius of internal surface 956 and penetrate into sheath 94b of output connector 94. Ridges 956a and 956b are circumferential, in so far as they extend around axis X95. Radial ridges 956a and 956b have an internal diameter DR slightly inferior to diameter D94, so that ridges 956a and 956b penetrate into sheath 94b but do not reach electrical wires 94a. By slightly inferior, one means here that the ratio DR/D94 is larger than or equal to 0.7, preferably larger than or equal to 0.85 and strictly smaller than 1.

When connector 94 is assembled between first shell 950 and second shell 952, translation of output connector 94 along axis X95 is blocked by local penetration of ridges 956a and 956b in sheath 94b. Ridges 956a and 956b prevents output connector 94 from being pulled out of tubular body 95 along axis X95. The penetration of ridges 956a and 956b in sheath 94b prevents sheath 94b from being moved away and the electrical wires from being uncovered. Tubular body 95 provides a supplementary protection against damages on the soldering of ends 94a1 on printed circuit board 88. In a non-represented embodiment, internal surface 956 only comprises one ridge.

To further tighten the assembly between connector 94a, first shell 950 and second shell 952 and to isolate PCB 88 from the outside, an encapsulating synthetic material 96 is injected between output connector 94 and internal surface 956. Internal surface 956 delimits, with respect to output connector 94, an internal cavity V95. At both ends along axis X95, internal cavity V95 has two smaller cavities V95a and V95b, which have a diameter superior to the diameter of internal cavity V95 in its central area comprised between ridges 956a and 956b, which corresponds to diameter D956. The synthetic material injected in cavities V95a and V95b provides a resistance against the pulling out of output connector 94. Synthetic material 96 is preferably injected in the same production step as plastic layer 92.

The synthetic material injected on cavities V95, V95a and V95b is preferably chosen amongst silicones, epoxys, polymers or adhesive resins such as polyamide-based thermoplastics, for instance Macromelt® materials.

As shown on FIG. 3, ridges 956a and 956b are interrupted on two portions of their circumference. This permits to create two continuous synthetic angular sectors between cavities V95a and V95b. According to a non shown embodiment, ridges 956a and 956b may extend on the whole circumference of internal surface 956.

Half shells 950 and 952 are kept assembled to each other by a ferrule 98. In a preferred embodiment, ferrule 98 comprises a metallic material. In another preferred embodiment, ferrule 98 is made from a metallic material and has a substantially cylindrical shape centered on axis X95 and is adapted to be pressed against outer cylindrical surface 958 of tubular body 95. Advantageously, ferrule 98 is press fitted on tubular body 95.

According to a non-represented embodiment, ferrule 98 is made from a synthetic material and is welded on tubular body 95.

Figure 9:
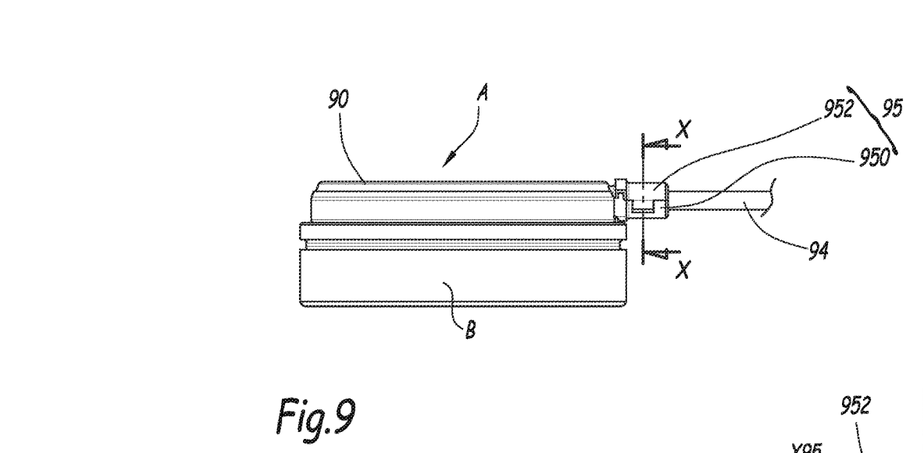
FIG. 9 is a side view of an instrumented bearing according to a second embodiment of the invention.
Figure 10:
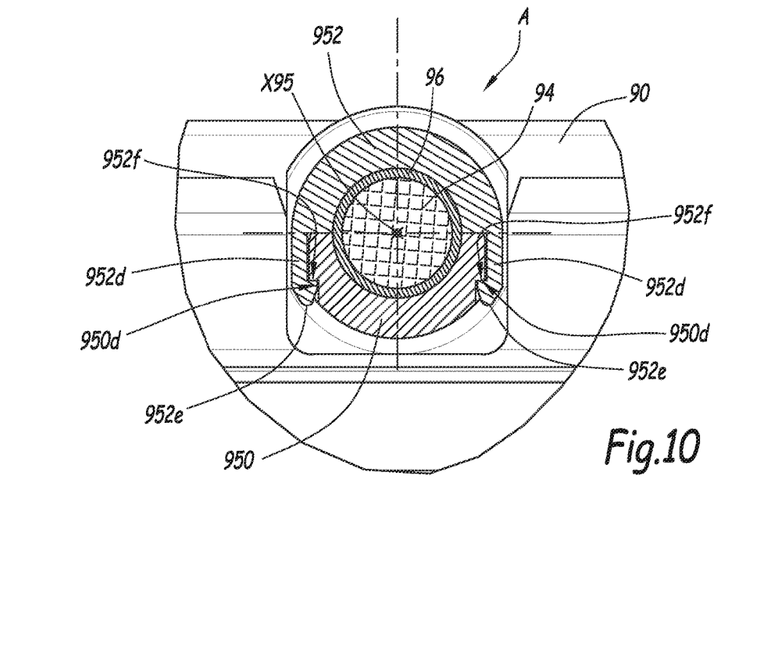
FIG. 10 is a sectional view, at a larger scale, along plane X, of the instrumented bearing of FIG. 9.

A second embodiment of the invention is represented on FIGS. 9 and 10. In this second embodiment, parts similar to the first embodiment have the same references.

Hereafter, only the differences with respect to the first embodiment are listed. In this second embodiment, second half shell 952 comprises two elastically deformable tabs 952*d*, which are tangent to outer cylindrical surface 958 and which are opposed at both ends of a diameter of tubular body 95. Each tab 952*d* has a free end 952*e* which comprises a hook 952*f*, adapted to be received in a corresponding recess 950*d* of first half shell 950 in order to keep half shells 950 and 952 assembled to each other.

According to a non-represented embodiment of the invention, sensor unit 8 does not comprise any ferrule 98. First half shell 950 and second half shell 952 are simply welded to each other.

According to a non-shown embodiment of the invention, first half shell 950 and second half shell 952 may also be welded to each other and kept assembled by a ferrule or hooked elastically via deformable tabs received in recesses.

The features of the embodiments and alternative embodiments mentioned hereabove can be combined to create further embodiments of the invention.

The invention claimed is:

1. A sensor unit for sensing the angular position of a rotatable element with respect to a non-rotatable element, the sensor unit comprising:
    an encoder fast in rotation with the rotatable element, and
    a sensor body fixed with respect to the non-rotatable element, the sensor body including:
    at least one sensing element configured to sense one of the angular position or the rotation speed and direction of the encoder,
    a support member for a signal processing feature, and
    an output connector for transmitting sensing data, the output connector comprising at least one electrical wire connected to the support member,
    wherein the sensor unit comprises a tubular body configured to accommodate the output connector, the tubular body being divided into a first half shell integral with the sensor body and a second half shell assembled with the first half shell around the output connector,
    wherein an internal surface of the tubular body comprises at least one radial ridge configured to block a translation of the output connector along a longitudinal axis of the tubular body by penetrating into a sheath of the output connector,
    wherein the first half shell of the tubular body is integral with a sensor holder that belongs to the sensor body and in which the at least one sensing element and the support member are mounted.

2. The sensor unit according to claim 1, one of the half shells further comprising protruding portions configured to cooperate with recesses of the other half shell, and the protruding portions further comprising planar surfaces configured to cooperate with planar surfaces of the recesses, said
    wherein the planar surfaces are perpendicular to the longitudinal axis of the tubular body.

3. The sensor unit according to claim 1, wherein the diameter of the at least one ridge is slightly inferior to the outer diameter of the output connector.

4. The sensor unit according to claim 1, the internal surface of the tubular body further comprising two ridges.

5. The sensor unit according to claim 1, wherein an internal cavity extending between the internal surface of the tubular body and the sheath of the output connector is filled with an encapsulatic synthetic material.

6. The sensor unit according to claim 5, wherein the at least one ridge is interrupted on a portion of a circumference thereof.

7. The sensor unit according to claim 1, wherein the two half shells of the tubular body are kept assembled to each other by a ferrule.

8. The sensor unit according to claim 7, wherein the ferrule is metallic and is press fitted on the tubular body.

9. The sensor unit according to claim 7, wherein the ferrule is synthetic and is welded on the tubular body.

10. The sensor unit according to claim 1, one of the half shells of the tubular body further comprising elastically deformable tabs, and a free end of each of the tabs further comprising a hook configured to be received in a recess of the other half shell in order to keep the two half shells assembled to each other.

11. The sensor unit according to claim 1, wherein the two half shells of the tubular body are welded to each other.

12. An instrumented bearing comprising:
    a rolling bearing; and
    a sensor unit; the sensor unit comprising:
    an encoder fast in rotation with a rotatable element, and
    a sensor body fixed with respect to the non-rotatable element, the sensor body including:
    at least one sensing element configured to sense one of the angular position or the
    rotation speed and direction of the encoder,
    a support member for a signal processing feature, and
    an output connector for transmitting sensing data, the output connector
    comprising at least one electrical wire connected to the support member,
    wherein the sensor unit comprises a tubular body configured to accommodate the output connector, the tubular body being divided into a first half shell integral with the sensor body and a second half shell assembled with the first half shell around the output connector,
    wherein an internal surface of the tubular body comprises at least one radial ridge configured to block a translation of the output connector along a longitudinal axis of the tubular body by penetrating into a sheath of the output connector,
    wherein the first half shell of the tubular body is integral with a sensor holder that belongs to the sensor body and in which the at least one sensing element and the support member are mounted.

* * * * *